United States Patent [19]

Eerkens

[11] Patent Number: 5,015,348
[45] Date of Patent: May 14, 1991

[54] HIGH MASS ISOTOPE SEPARATION ARRANGEMENT

[76] Inventor: Jozef W. Eerkens, 1342 Lachman La., Pacific Palisades, Calif. 90272

[21] Appl. No.: 262,661

[22] Filed: Jun. 14, 1972

[51] Int. Cl.[5] .......................... B01J 19/08; B01D 5/00
[52] U.S. Cl. ............................ 204/157.2; 204/157.21; 204/157.22; 204/193; 422/186
[58] Field of Search ................. 204/157.1, 193, 157.2, 204/157.21, 157.22; 422/186

[56] References Cited

U.S. PATENT DOCUMENTS

| 3,673,406 | 6/1972 | Nief | 204/157.2 |
| 3,951,768 | 4/1976 | Gürs | 204/157.2 |

FOREIGN PATENT DOCUMENTS 1959767 6/1971 Fed. Rep. of Germany .

Primary Examiner—John F. Niebling
Assistant Examiner—Ben C. Hsing
Attorney, Agent, or Firm—Ladas & Parry

[57] ABSTRACT

An isotope separation arrangement for separating a preselected isotope from a mixture of chemically identical but isotopically different molecules by either photon-induced pure rovibrational or vibronic selective excitation of the molecules containing the atoms of the isotope to be separated from a lower to a higher energy level, and a chemical reaction of the higher energy level molecules with a chemically reactive agent to form a chemical compound containing primarily the atoms of isotope to be separated in a physicochemical state different from the physicochemical state of the mixture of chemically identical but isotopically different molecules. The chemical compound containing the atoms of the isotope to be separated may be subsequently processed to obtain the isotope.

19 Claims, 3 Drawing Sheets

HIGH MASS ISOTOPE SEPARATION ARRANGEMENT

BACKGROUND OF THE INVENTION

1. Field of the Invention

This invention relates to the isotope separation art and, more particularly, to a selectively photon induced energy level transition of an isotopic molecule containing the isotope to be separated and a chemical reaction with a chemically reactive agent to provide a chemical compound containing atoms of the isotope desired.

2. Description of the Prior Art

In many applications, it is often desired to provide an isotopically concentrated element. That is, many elements exist in nature in several different isotopes and it is desired to isolate a single isotope to provide a substantially higher concentrate of the isotope than occurs naturally. One such application, of course, is providing a high concentration of the isotope $U^{235}$. $U^{235}$ constitutes only 0.7% of naturally occuring uranium. The balance of the uranium, 99.3%, is $U^{238}$.

Many different techniques have been proposed and/or utilized to provide the separation of the isotope $U^{235}$ from naturally occurring uranium. Among these techniques have been gaseous diffusion through porous barrier materials, electromagnetic separation, centrifuging, thermal diffusion, chemical exchange and, more recently, ultra-centrifuge and jet nozzle techniques. Of these, the most widely used technique is the gaseous diffusion technique which, unfortunately, is relatively inefficient, comparatively expensive and requires multiple passes of gaseous uranium through the barrier materials to obtain a high concentration of the $U^{235}$.

Other isotopic separation techniques have been utilized for elements which have a low boiling point. For example, there has heretofore been proposed, in U.S. Pat. No. 2,713,025, an isotope separation technique applicable to mercury wherein a mercury vapor lamp, contaning isotopically pure mercury, is utilized to irradiate a low-temperature vapor of naturally occurring mercury. The photons from the isotopically pure mercury vapor lamp excite only the same isotope atoms in the mercury vapor and cause photon-induced transitions between energy states thereof. At an excited energy state the mercury combines with water to form mercuric oxide. Since the photons were emitted from a single isotope of the mercury, only the same corresponding isotope in the mercury vapor was excited and thus isotopically pure mercury could be obtained from subsequent processing of the mercuric oxide. This technique, while applicable to some low boiling-point elements cannot be readily adapted to the higher boiling-point isotopes such as uranium. The reason is that to provide a vapor of uranium would require comparatively high temperatures. Such high temperatures would result in considerable Doppler broadening of the absorption/emission lines of the uranium atoms such that the absorption/emission lines of the $U^{238}$ atoms substantially overlap the $U^{235}$ atoms, thus providing no difference in the absorption lines to allow selective excitation of the $U^{235}$ by this technique.

Another technique heretofore proposed involving photon-induced transitions, as disclosed in U.S. Pat. No. 3,405,045, involves the irradiation of organic monomers with coherent radiation from a laser to effect a photodisassociation of the monomer into free radicals. The free radicals then are utilized to initiate a polymer chain reaction, thus effecting the desired polymerization. Such teaching does not appear to be generally applicable to isotope separation.

Another technique, specifically designed for isotope separation of uranium hexafluoride ($UF_6$) to obtain, ultimately, isotopically concentrated $U^{235}F_6$, as disclosed in U.S. Pat. No. 3,443,087, involves irradiating a moving stream of $UF_6$ with two separate beams of electromagnetic radiation. The first beam of electromagnetic radiation raises the internal energy of only the $U^{235}F_6$ from the ground energy state to a higher, excited energy state. The second beam of electromagnetic radiation acts only upon the excited-state $U^{235}F_6$ molecules and raises them past the ionization potential to provide ionized molecules of $U^{235}F_6$. A magnetic field and/or an electric field are then applied to the ionized $U^{235}F_6$ molecules to deflect them from the path of the unexcited $U^{238}F_6$ molecules in an attempt to effect the separation. However, while the utilization of lasers to provide the photons has been suggested, no technique for selectively providing the photons in the first beam of electromagnetic radiation only with energies corresponding to the $U^{235}F_6$ transitions, and not also to the $U^{238}F_6$ transitions was actually proposed. Further, the partial utilization of electronic-excited and/or ionized states limits reaction times, since the decay time for electronic-excited and ionized states is quite short. Finally, and most importantly, there is considerable overlap of spectral lines of $U^{235}F_6$ and $U^{238}F_6$ under practical operating conditions that allow significant ionization and/or electronic excitation in gaseous $UF_6$ thereby rendering this isotope separation process rather inefficient.

In another isotope separation technique utilizing a hydrogen fluoride laser, as disclosed in "Isotope Separation with the CW Hydrogen Fluoride Laser", *Applied Physics Letters*, Vol. 17, No. 12, 15 Dec. 1970, separation of low mass molecules to effect a separation of deuterium from hydrogen is proposed. This technique involves the irradiation of a gas combination of methanol $H_3COH$, deutero-methanol $D_3COD$, and bromine $Br_2$. The methanol is intended to be selectively reacted with the bromine, leaving the deutero-methanol in the gas phase. Deuterium is, of course, the desired isotope to be concentrated. Thus, the methanol absorbs the radiation from the hydrogen fluoride laser and reacts with the bromine. No filtering or fine tuning of the laser radiation is utilized since the absorption lines of the methanol $H_3COH$ and the deutero-methanol $D_3COD$ are very widely separated. High mass isotopes, on the other hand, have very closely spaced absorption lines that are virtually optically unresolvable except at very low temperatures and/or pressures. Consequently, direct unfiltered and/or untuned utilization of laser radiation to effect isotopic separation in high mass molecules is not practical.

Thus, there has not heretofore been provided a completely satisfactory and economical photochemical technique for separating heavy isotopes and, in particular, for the isotopic separation of desired $U^{235}$ isotope from naturally occurring uranium.

SUMMARY OF THE INVENTION

Accordingly, it is an object of the present invention to provide an improved isotope separation technique.

It is another object of the present invention to provide an improved isotope separation technique that is particularly useful in the separation of high mass isotopes.

It is yet another object of the present invention to provide an improved isotope separation technique for separating $U^{235}$ isotope from naturally occurring uranium that is comparatively economic in operation and provides a high yield of concentrated $U^{235}$ isotope.

In the following summary of the invention, and the detailed description presented of the preferred embodiments of the present invention, there has been utilized the application of the present invention to the separation of $U^{235}$ from a mixture of molecules, some containing $U^{235}$ atoms and some containing $U^{238}$ atoms It will be appreciated that the separation technique of the present invention may equally well be utilized with other elements to provide isotopic separation. However, because of the importance of $U^{235}$ as a major supplier of energy and the necessity of obtaining a higher concentration of $U^{235}$ than in normally occurring uranium the principles of the present invention are best exemplified by utilizing, as an example, the separation of the isotope $U^{235}$.

In the preferred embodiment of the present invention, there is provided both a process and the apparatus for selectively separating a predetermined isotopic molecule from a collection of chemically identical but isotopically different molecules. For example, a mixture of gaseous $UF_6$ containing $U^{235}F_6$ and $U^{238}F_6$ molecules is contained within a reaction chamber. A chemically reactive agent which, for utilization in separating $U^{235}$ according to the principles of the present invention, may be gaseous hydrogen, is also introduced into the reaction chamber. The mixture of the chemically reactive agent may be either continuously supplied and removed from the reaction chamber or it may be charged and discharged as in a batch process.

The mixture of molecules in the reaction chamber is maintained at preselected values of temperature, pressure, electric field, magnetic field, and whatever other conditioning parameters can be used to effect the original total energy state of the molecules. The initial state of a molecule may be termed the lower energy state. The molecules are capable of storing additional energy internally in discrete amounts by the three mechanisms of electronic excitation, vibrational excitation, and rotational excitation, in any combination. Any of these energy states requiring additional energy is referred to as a higher energy state, and if a particular one is considered it is called the upper energy state. For example, when utilizing $UF_6$, the preselected conditions may be chosen so that the lower internal energy state of the $UF_6$ molecules comprises the ground (lowest possible) electronic energy level, the ground (lowest possible) vibrational energy level, and a certain distribution of rotational energy levels determined by the temperature, while the upper energy state might comprise the ground electronic level, a particular combination of vibrational energy levels, and the same distribution of rotational levels as in the lower state.

The chemically reactive agent, such as the hydrogen, is virtually inactive with the molecules at the lower energy state, but is chemically reactive with the molecules when they are at higher energy states above a certain "activation" energy state. When the chemically reactive agent reacts with the molecules at the higher energy state, a chemical compound is produced and the chemical compound is in a second physicochemical state different from the first physicochemical state at which the mixture is maintained. For example, the $UF_6$ may be maintained in a gaseous state at the ground energy level and the reaction with hydrogen of the $UF_6$ molecules that are excited to the upper energy level, provides $UF_4$ as one of the reaction products. $UF_4$ is in the solid physical state and will precipitate out of a gaseous $UF_6$/hydrogen mixture and can thus be separated physically. If the chemical compound produced is in the same physical state as the original mixture, separation may be effected by standard chemicals separation techniques such as solvent extraction, distillation, evaporation, and others. Thus, a change in the physicochemical state may be a change in the physical state, a change in the chemical state, or both.

In order to effect the selective reaction between just the predetermined isotopic molecules containing the isotope that is to be separated with the chemically reactive agent, it is necessary to induce the transition of only the predetermined isotopic molecules from the lower energy state to the higher energy state The selective isotopic excitation is achieved by subjecting the contents of the reaction chamber to a beam of photons having energy at a frequency corresponding to a particular transition between the lower energy state and a particular higher energy state of only the predetermined isotopic molecule The beam of photons is free of photons having energy at frequencies corresponding to the transition from the lower energy to the higher energy state of the other isotopically different but chemically identical molecules contained within the reaction chamber. Therefore, only the predetermined isotopic molecules are selectively excited. At the excited state, the predetermined isotopic molecules can react with the chemically reactive agent to provide the chemical compound By providing an excess of chemical reactive agent, a majority of the predetermined excited molecules may be made to experience such reactions before losing their excitation energy by possible exchange collisions to molecules containing the other isotope Since only the predetermined isotopic molecules are excited by photons and a majority of them react before a kinetic collision with energy exchange can occur, the chemical compound contains a preponderance of atoms of the predetermined isotope. If the chemical compound is at a different physical state than the molecules of the mixture, the chemical compound may be physically removed from the reaction chamber as, for example, in the case that a solid precipitate is formed in a gaseous mixture. The precipitate may then be further processed, by conventional means, to provide the concentrated predetermined isotope. If the new chemical compound is in the same physical state as the original mixture (e.g. both are gaseous), final separation may be accomplished by solvent extraction, distillation, condensation/evaporation, or other standard chemicals separation methods.

The beam of photons may be provided by a laser which is internally or externally filtered to suppress or remove photons with undesirable frequencies. Thus, a laser is selected whose output contains photons in the general frequency range associated with a particular photon-active transition of the molecules of the mixture from the original lower energy state to a particular upper energy state. Because of the phenomenon known as the isotope shift, the precise frequencies associated with the photon-inducible transitions between the lower energy state and the upper energy state are slightly different for the different isotopes and for the molecules containing the different isotopes.

Filtering of the laser output is achieved by passing the laser photons internally or externally through a filter cell, where by internal is meant placement of the filter cell internal to the laser between the end mirrors of the resonator system, and by external is meant that the filter cell is placed outside the laser in the path of the laser output beam. The filter cell contains a collection of the isotopic molecules contained in the reaction chamber other than the predetermined isotopic molecules and is, of course, provided with windows which allow the passage of the laser photon beam through the cell. For example, with the reaction chamber containing $U^{235}F_6$ molecules and $U^{238}F_6$ molecules, the filter cell contains substantially pure $U^{238}F_6$ molecules Using an infrared laser with the filter cell placed internally, those photons having energy corresponding to transitions in the $U^{238}F_6$ molecules from the lower to a predetermined upper vibrational energy level are absorbed and thus prevented to lase, while those photons having frequencies that are slightly different and which correspond to a transition in the $U^{235}F_6$ molecules from lower rovibrational energy level to an upper rovibrational energy level, can pass through the filter cell and provide the beam of photons necessary to effect the selective excitation of the $U^{235}F_6$ molecules in the reaction chamber.

The temperature, pressure, and other conditions of the $UF_6$ gas in both the filter cell and in the reaction chamber in this example must be chosen in such a manner that the rotational lines in a certain selected rovibrational band are separated, and that in some region of the spectrum of this rovibrational absorption band, the rotational lines of $U^{235}F_6$ do not significantly overlap with the rotational lines of $U^{238}F_6$ and fall between the rotational lines of $U^{238}F_6$. The laser photon frequency is fine-tuned by the laser resonator system to fall in the middle of one or more of the rotational lines of $U^{235}F_6$ in this region. The laser fine-tuning may be accomplished for example, by having a variable spacing between the laser resonator end mirrors, and by making small adjustments in the spacing. Changes in the mirror spacing produces changes in the exact photon frequency of the laser output.

The collection of molecules in the filter cell are usually maintained at or near the same lower energy state as those present in the reaction chamber.

In one embodiment of the invention the filter cell is placed between the laser resonator end mirrors and a high overall efficiency of operation is usually achieved since the filter cell suppresses the generation of laser photons having undesirable frequencies and only promotes the generation of laser photons of the desired frequency in the laser cavity. In another embodiment of the present invention, in which the filter cell is placed external to the laser end mirrors and the entire laser output is filtered therethrough, that portion of the laser output energy which is carried by laser photons with undesirable frequencies is removed and lost. In spite of the lower overall efficiency of the external filter cell arrangement in comparison with the internal filter cell placement, the former may be preferred sometimes since it provides more independence between laser operation and filter-cell operation.

BRIEF DESCRIPTION OF THE DRAWINGS

The above and other embodiments of the present invention may be more fully understood from the following description and the accompanying drawings wherein similar reference characters refer to similar elements throughout and in which.

DESCRIPTION OF THE PREFERRED EMBODIMENTS

Figure 1:
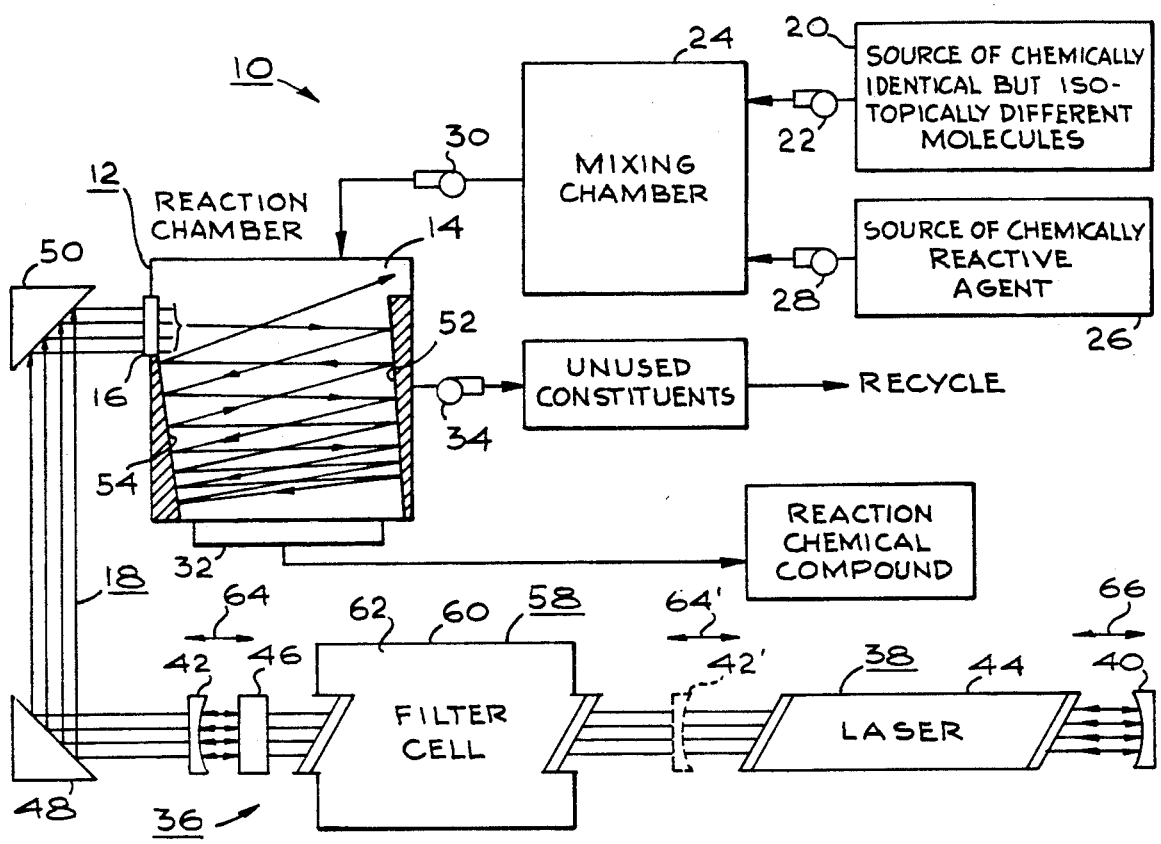
FIG. 1 is a schematic diagram of one embodiment of the present invention.

Before providing a detailed description of the preferred embodiments of the present invention, there is presented a brief discussion of the physical processes associated with the practice of the present invention in order to provide a more comprehensive understanding of the techniques associated with the practice of the present invention so that those skilled in the art may be more fully apprised thereof.

In a gaseous molecule there exist three main types of internal-energy-storing mechanisms, each one of which can acquire or discharge certain discrete quantities of energy. These are: the electronic, the vibrational, and the rotational internal-energy-storage mechanisms. Each of these types of energy-storing mechanisms possess certain discrete energy levels, and energy can be added or subtracted from storage, in quantities corresponding to differences between these energy levels, by either energy transfer during the collision with another molecule, or by the absorption or emission of a photon.

The quantities of energy exchanged (so-called quanta) in transitions between electronic levels are usually an order of magnitude larger than the quanta produced in transitions between vibrational levels, while quanta exchanged in rotational transitions have again energies that are an order of magnitude smaller than those of the vibrational transitions. In transitions involving the absorption or emission of photons, the wavelength of the photon associated with an electronic transition lies generally in the ultraviolet and visible part of the spectrum, the photon wavelength for vibrational transitions lies in the infrared, while rotational transitions give rise to photons-with wavelengths that lie in the microwave region.

In general, the more atoms there are in a molecule, the more vibrating bonds can exist between atoms and groups of atoms, and the larger the number of so-called normal vibrations. Each normal vibration possesses a series of discrete energy levels, and in general a transition in the vibrational state of a molecule can involve simultaneous changes in the levels of any combination of normal vibrations.

With regard to the energy necessary to effect a transition from one electronic energy state to another electronic energy state by means of molecular collisions in which conversion of kinetic to potential energy occurs, since the energy exchange quanta required are comparatively high, in most molecules the higher electronic-energy states are only achieved at temperatures approaching plasma temperatures on the order of 3000 degrees K or higher Kinetic excitation of the higher vibrational energy levels, with the electronic state remaining at the ground level, can be achieved at typical temperatures of 1000 to 2000 degrees K. Finally, at low temperatures such as room temperature, approximately 300 degrees K, there can generally be only kinetic excitations and de-excitations involving transitions between rotational energy levels.

The kinetic excitations, in which during a collision between two molecules transitional kinetic energy is exchanged and electronic, vibrational, or rotational energy levels are changed, must be distinguished from molecular interactions with photons, where upon absorption or emission of a photon, the rotational energy levels, the vibrational energy levels and/or electronic energy levels are excited or de-excited. The absorption of a photon raises the internal energy of a molecule and the emission of a photon reduces the internal energy.

In photon-molecule interactions, not all possible transition between lower and higher rotational, vibrational or electronic energy levels are allowed. Instead only certain transitions are allowed which are determined by so-called selection rules. Thus the number of excited rotational, vibrational or electronic transitions possible in photon-induced processes are limited to those defined by the selection rules. Further, the selection rules by defining the allowable transitions also define the photon energy necessary to achieve a certain transition from a lower to a higher energy level, either electronic, vibrational, or rotational, or in some combination. Transitions in which an electronic as well as a vibrational level are simultaneously changed, are termed vibronic transitions, while transitions in which the vibrational as well, as the rotational level changes simultaneously, with the electronic level remaining the same, are termed rovibrational transitions. Rotational transitions also accompany vibronic transitions, but their effect on the transition rate is usually small and thus "rovibronic" transitions are simply called vibronic transitions. By "a vibronic transition" we shall mean a transition with a certain electronic energy level change and any one of a number of allowed vibrational (and rotational) level changes. By "a rovibrational transition", we shall mean a transition with a certain vibrational energy level change, and any one of a number of allowed rotational level changes, while the electronic state is unchanged.

Clearly, in considering the energy transitions useful in the practice of the present invention, consideration must be given not only to the allowable energy transitions of the molecules but also to the means for generating the photons having the energies corresponding to the desired energy transitions.

Typical lifetimes for the spontaneous emission of radiation by molecules in electronic excited states and ionized states are on the order of $10^{-7}$ to $10^{-8}$ seconds. Hence chemical reactions with molecules in excited electronic states are difficult to achieve unless reaction times are faster than $10^{-7}$ to $10^{-8}$ seconds Radiative lifetimes of vibrationally excited states on the other hand are in the vicinity of $10^{-3}$ to $10^{-4}$ seconds. Hence sufficient time exists for chemical reaction which at typical pressures of $10^{-2}$ to $10^{-1}$ atmospheres, favorable for good rotational line resolution and thus efficient isotope separation, usually requires $10^{-7}$ to $10^{-5}$ seconds per molecular reaction. Rotational states have radiative lifetimes usually in the range between 10 and $10^4$ seconds.

The radiative emission spectrum of a vibronic energy transition is generally a series of bands, where inside of each band there is a substructure composed of various rotational lines whose spacing and regularity are determined by the selection rules for radiative transitions.

The radiative emission spectrum of a rovibrational energy transition is a single band composed of rotational lines whose spacing and regularity are determined by the selection rules for radiative transitions.

A vibrational band, whether part of the series of bands in a vibronic spectrum or a band from a rovibrational spectrum, comprises an envelope extending over a known region of photon frequencies and within this envelope there are nearly discrete frequencies also called lines that correspond to the allowed rotational energy transitions. The rotational lines are subject to pressure and temperature broadening. That is, as the temperature of the molecules is raised, the small variation in allowed frequencies associated with each rotational line increases until there is a substantial overlap of the lines and there is no longer any spacing between the lines. This broadening effect on the rotational lines is often called "temperature broadening". Another effect that causes the lines to broaden occurs when the pressure or density of the molecules is increased. This is called "pressure-broadening". Therefore, if only certain definite rotational transitions in a vibrational band are to be induced, and not several ones of adjacent overlapping lines, it is necessary that the temperature and pressure of the molecules be kept comparatively low so that the frequency widths of the rotational lines are small and at least smaller than the frequency difference between the centers of two consecutive rotational lines, also called the line spacing.

Another physical feature that is important to the understanding of the principles of the present invention is the so-called isotope frequency shift of vibrational energy level transitions. Since the frequency of the photon associated with certain transitions between vibrational energy levels depends on the mass of the molecule, the center frequency of the vibrational bands of two chemically identical but isotopically different molecules will be slightly different. An isotope shift also exists for electronic energy level transitions but this shift is much smaller than the isotope shift associated with the vibrational energy level transitions.

Because the frequencies of the vibrational bands of two chemically identical but isotopically different molecules are thus slightly shifted, the rotational lines of the band of one of the isotopic molecules may fall between the rotational lines of the band of the other isotopic molecule. Hence, to effect isotope separation in an isotopic mixture of molecules, the mixture is irradiated with extremely monochromatic photons of frequencies that correspond only to one or sometimes a few of the rotational lines in the rovibrational band of only one of the two isotopic molecules. Usually only an infrared laser can provide photons of the monochromaticity necessary to excite only one rotational line in a rovibrational band, while only an ultraviolet laser can excite one rotational line of a vibronic band. Hence in the embodiments of the present invention a laser is employed as the source of photons. However, any other source yielding such photons may be substituted if available.

Because the vibrational isotope shift is many orders of magnitude larger than the electronic isotope shift, the employment of molecules and the vibrational isotope shift in the present invention yields substantially more efficient isotope separation than if atoms in elemental form were used and isotope separation was attempted by the electronic isotope shift as has been heretofore proposed. This is particularly true for high-boiling-point elements which can form a low-boiling-point molecule. Also, the higher the mass of the isotopic elements, the more difficult it is to employ elemental atomic isotope separation with the pure electronic isotope shift, and the more important molecular isotope separation becomes which relies on the vibrational isotope shift.

To insure that laser photons used in this invention possess frequencies that match only the frequency of one or several of the rotational lines of the isotopic molecule to be excited and subsequently separated, the laser frequency is tuned by means of a filter cell that is placed internal or external to the laser resonator system. The filter cell contains molecules with isotope atoms different from the molecules with the isotope atoms to be excited and separated. Hence laser photons with frequencies that match the frequencies of the rotational lines of the molecules in the filter cell will be suppressed or removed by absorption, allowing only photons with frequencies between the rotational line frequencies to be generated or passed on from the laser. Since the molecules with the isotope to be excited and separated have their rotational lines shifted in frequency to positions between the rotational lines of the molecules in the filter cell, the laser photons will have frequencies that match or nearly match the frequencies of one or more rotational lines of the isotopic molecule to be excited and separated. Additional fine-tuning of the laser photon frequencies to effect coincidence with the peak or peaks of the rotational line or lines of the isotopic molecule to be excited and separated, may be achieved by small adjustments in the spacing of the laser resonator end mirrors.

The vibrational isotope shift may cause the evenly spaced rotational line frequencies of the rovibration band of one isotopic molecule to coincide with the evenly spaced rotational line frequencies of the other isotopic molecule. However, since molecules possess a large number of rovibrational bands whose isotope shifts are not all exactly the same, it is generally possible to find one band where the rotational line frequencies of one isotopic molecule fall substantially between the rotational line frequencies of the other isotopic molecule. By choosing an infrared laser whose output frequency is somewhere in this band, the laser frequency may then be slightly adjusted by filtering and fine-tuning as described.

If the filter cell is placed internal to the laser resonator, that is between the end mirrors, only those photons are allowed to lase which are not absorbed by the filter cell, that is photons with the desired frequency for exciting the desired isotopic molecule. If the filter cell is placed external to the laser, the laser frequency must be fine-tuned by mirror spacing adjustments until a maximum of filtered photons passes through the filter cell. At that point the laser photon frequency or frequencies are primarily between the frequencies of the rotational lines in the filter cell and thus coinciding with the rotational line frequency or frequencies of the desired isotopic molecule to be excited and separated.

With the above in mind, reference is made to FIG. 1 wherein there is shown a schematic diagram of one embodiment of the present invention, generally designed 10. In the embodiment 10, there is provided a reaction chamber generally designated 12 having walls defining a cavity 14. A window 16 is provided in the reaction chamber 12 to allow the entrance therein of a beam of photons 18 having energy in preselected frequencies as discussed below in greater detail.

A source mixture of chemically identical but isotopically different molecules 20 is connected to a pump 22 that pumps the chemically identical but isotopically different molecules into a mixing chamber 24. A source 26 of chemically reactive agent is pumped by pump means 28 into the mixing chamber 24. As described below in greater detail, the ratio of the amount of chemically identical but isotopically different molecules to the amount of chemically reactive agent is selected to provide a proper reaction therebetween. The contents of the mixing chamber 24 are pumped by pump 30 into the cavity 14 of the reaction chamber 12. It will be appreciated, of course, that the mixing chamber 24 may be omitted and the chemically reactive agent and the mixture of chemically identical but isotopically different molecules may be pumped directly into the cavity 14 of the reaction chamber.

Removal means 32 is connected to the reaction chamber 12 for selectively removing a preselected chemical product from the cavity 14 after the desired chemical reaction has been induced. A pump 34 may be utilized to remove from the cavity 14 of the reaction chamber 12 the remaining contents thereof which have not particpated in the desired chemical reaction.

A means for generating the beam of photons 18, generally designated 36, is provided and, in preferred embodiments of the invention, it generally comprises a laser 38 having a pair of end mirrors 40 and 42 utilized to achieve laser action within a laser cell 44. The laser end mirror 42, in accordance with laser operational techniques, also has a certain percentage of transmission such as 1 to 10% transmission to allow the laser photon beam 18 generated by laser action to exit from the laser 38.

If desired, a frequency doubler 46 may be placed internal to the laser end mirrors to double the natural laser frequency of the photons. If a far-infrared laser is used, the frequency doubler may be, for example, a Cadmium Germanium Arsenide ($CdGeAs_2$) crystal to provide photons having energy in the frequencies necessary to accomplish the selective isotopic separation according to the principles of the present invention.

A pair of mirrors 48 and 50 may be utilized to direct the beam of photons 18 through the window 16 in the reaction chamber 12 and into the cavity 14 thereof. Internal to the cavity 14 there may be provided a pair of slightly tilted mirrors 52 and 54 which may be positioned as required to provide the necessary total path length for efficient absorption of the photons in the beam of photons 18 in the cavity 14 of the reaction chamber 12. Instead of the tilted-mirror pair 52 and 54, any other arrangement of mirrors and/or reflectors may be utilized to create a long path length for absorption, if required.

A filter cell 58, which may be considered to be part of the means 36 for generating the beam of photons 18 has walls 60 defining a filter cavity 62. A filter mixture is contained within the filter cavity 62 and the filter mixture is selected to remove from the beam of photons generated in the laser 38 those photons whose frequencies differ from those necessary in the beam of photons 18 to achieve the selective isotopic separation.

As can be seen from FIG. 1, the filter cell 58 lies between the mirrors 40 and 42 of the laser 38. This arrangement is usually preferred, since it directly prevents the generation of laser energy at unwanted frequencies.

Alternatively, the filter cell 58 may be placed external to the mirrors associated with the laser 38. For example, the filter cell 58 may be placed external to the mirrors 40 and 42, as shown by the dotted line position of mirror 42' on FIG. 1., so that the filter cell 58 is not within the laser resonator system comprising mirrors 40 and 42' and the laser cell 44. This arrangement allows more independence in operational control between the laser 38 and the filter cell 58, but may be less efficient than the internal arrangement, since some laser energy residing at unwanted frequencies may be removed from the laser beam by absorption and is subsequently lost. By fine-tuning the laser frequency, this loss may be minimized however.

Fine tuning of the laser 38 may be provided by having one of the laser end mirrors, for example mirror 42 or 42' adjustable in directions indicated by the double-ended arrows 64 or 64', respectively, so that more precise tuning of the frequency of the photons 18 is provided. The same may be achieved by moving mirror 40 instead of 42 or 42' in directions indicated by the double-ended arrow 66.

The above-described structure that is shown schematically in FIG. 1 is utilized in a process for separating predetermined isotopic molecules from a mixture of chemically identical but isotopically different molecules in order to obtain a concentration of the predetermined isotope far greater than the concentration in the naturally occurring element. For example, the above structure may be utilized in a process to provide a concentration of $U^{235}$ much greater than the 0.7% $U^{235}$ that is present in naturally occurring uranium.

As an illustrative example, the source of chemically identical but isotopically different molecules may comprise gaseous $UF_6$ containing predetermined isotopic molecules $U^{235}F_6$ and other chemically identical but isotopically different molecules $U^{238}F_6$. The chemically reactive agent in the source of chemically reactive agent 26 may be gaseous hydrogen. The $UF_6$ and the hydrogen may be mixed in the mixing chamber 24 in a ratio of, for example, one part $UF_6$ and nine parts hydrogen in order to provide an excess of hydrogen so that the induced chemical reaction, as described below, has a higher probability of occurring.

The mixture of the $UF_6$ and hydrogen is pumped into the cavity 14 of the reaction chamber 12 by the pump 30 and is maintained therein at a temperature of approximately 300 degrees K and a pressure of approximately 0.01 atmospheres which parameters define the lower energy state of uranium hexafluoride according to the principles of the present invention. Selective excitation of the $U^{235}F_6$ molecules is achieved by photon absorption from the beam of photons 18 causing transitions in the $U^{235}F_6$ from the lower vibrational energy level to an upper vibrational energy level.

In order to achieve this selective excitation, that is to provide the photon induced transitions of only the $U^{235}F_6$ molecules and not the $U^{238}F_6$ molecules, the filter cell 58 is provided with a filter gas in the filter cavity 62 comprising substantially pure gaseous $U^{238}F_6$. The temperature of the filter gas is approximately 290 degrees K and the pressure is approximately 0.005 atmosphere for reasons described below in greater detail. When photons generated in the laser cell 44 pass through the $U^{238}F_6$ filter gas, those photons having frequencies equal to the frequencies associated with photon-induced transitions between the lower vibrational energy level and upper vibrational energy level of $U^{238}F_6$ are absorbed, and thus prevented to lase in the case of an internal filter cell, or removed in the case of an external filter cell arrangement. Thus, there is provided in the filtered beam of photons 18, a substantially pure beam of photons having energy associated with the photon inducible transitions of only the $U^{235}F_6$. As this beam of photons passes through the cavity 14 of the reaction chamber 12, only the $U^{235}F_6$ and not the $U^{238}F_6$ molecules will absorb these photons, and the $U^{235}F_6$ molecules are raised from the lower vibrational energy level to the higher vibrational energy level. At the higher vibrational energy level, the $U^{235}F_6$ molecules are chemically reactive with the hydrogen gas and the following reaction takes place.

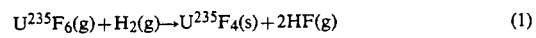

$$U^{235}F_6(g) + H_2(g) \rightarrow U^{235}F_4(s) + 2HF(g) \quad (1)$$

Since the $U^{235}F_4$ is in the solid state, which is physically and chemically different from the gaseous $UF_6$ contained within the reaction chamber 14, it may be removed as a precipitate from the reaction chamber 12 by the means 32.

The remaining gaseous $UF_6$, the gaseous hydrogen fluoride (HF), and the gaseous hydrogen ($H_2$), may be removed by the pump means 34 for ultimate recycling and reuse.

Both the $U^{235}F_4$ product removal, as well as removal of the remaining gaseous mixture of $UF_6$, HF, and $H_2$ may be either carried out in a continuous fashion or batchwise.

Figure 2:
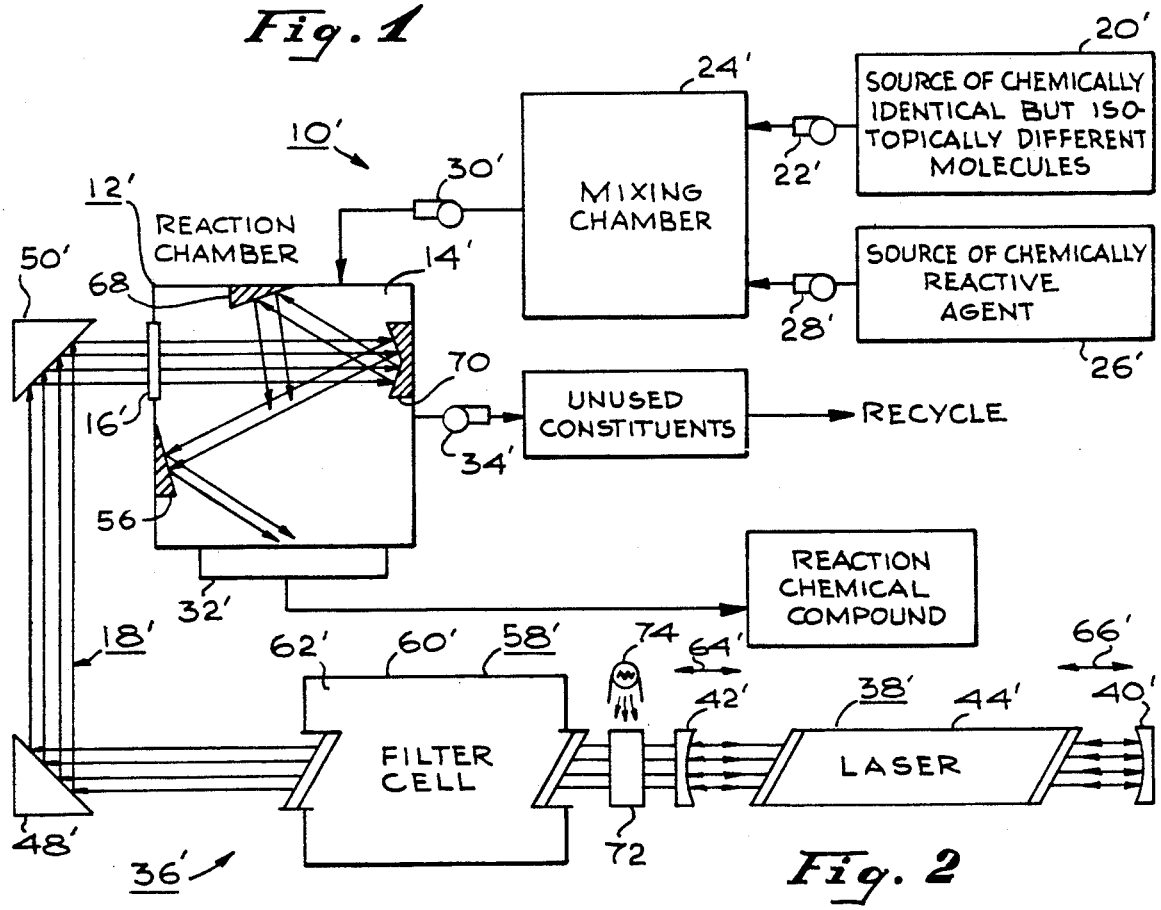
FIG. 2 is a schematic diagram of another embodiment of the present invention.

FIG. 2 illustrates another embodiment of the present invention. Instead of employing a pair of tilted mirrors 52 and 54 as shown in FIG. 1, the arrangement in FIG. 2 shows another train of mirrors for the dispersement of laser photons in the reaction chamber 12', namely mirrors 56, 68 and 70. Of course many other long absorptive optical paths such as White's spherical mirrors can be utilized, and the tilted mirror pair of FIG. 1 and the dispersive mirror configuration of FIG. 2 are only illustrative examples.

Also shown in FIG. 2 is a frequency conversion crystal 72 and source of idler radiation 74, placed outside of the laser 38', and placed in the laser beam path between the laser output mirror 42' and an externally placed filter cell 58'. The frequency conversion crystal 72 and idler pump radiation source 74 may be used in cases where it is desired to shift the frequency of a given laser to fall in the frequency range of a rovibrational or vibronic absorption band of the isotopic molecules to be separated. The external filter cell 58' serves the same function as the cell 58 of FIG. 1 and optimum output of desired filter photons may again be obtained by fine-tuning of the laser 38' by adjustments in the spacing between the laser end mirrors 40' and 42'. The remaining structure shown schematically on FIG. 2 may be similar to the corresponding structure shown in FIG. 1.

Figure 3:
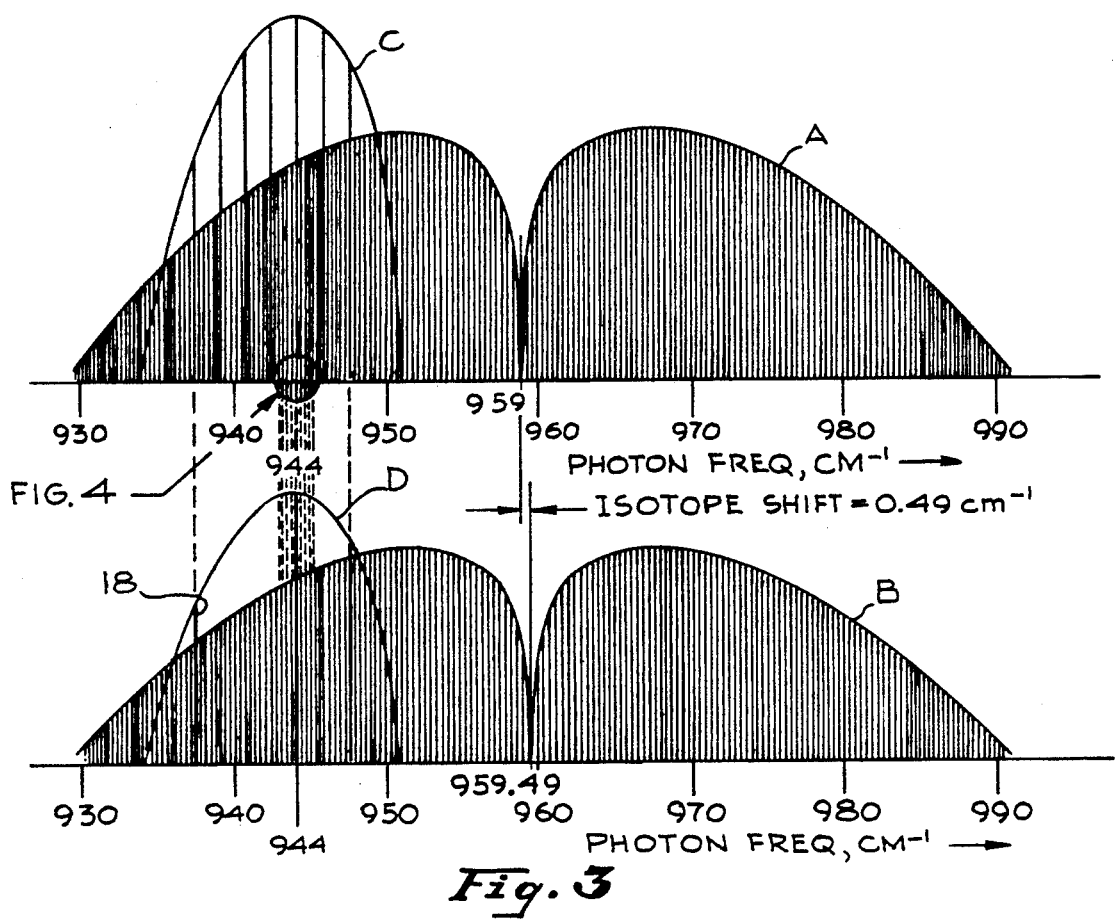
FIG. 3 is a graphical representation of some physical characteristics associated with the present invention.

Because of the mass difference between two isotopically different but chemically identical molecules there is an isotope shift of the rovibrational and vibronic absorption spectra between the two. FIG. 3 illustrates this phenomenon for the rovibration ($\nu_3 + \nu_4 + \nu_6$) combination absorption band of $U^{238}F_6$ and $U^{235}F_6$ whose central frequency is approximately at 960 cm$^{-1}$ (=28.80 Teraherz) and therefore close to the frequency of the $CO_2$ laser at about 944 cm$^{-1}$ (28.32 Teraherz).

FIG. 3 is an idealized approximation of the actual $(\nu_3+\nu_4+\nu_6)$ absorption band of $UF_6$, but is sufficient to indicate the major features of importance.

As shown in FIG. 3, curve A represents the absorption spectrum in the vicinity of 960 cm$^{-1}$ for $U^{238}F_6$ molecules, that are present in the filter gas contained in the filter cell 58 or 58'. The rovibrational band defined by curve A comprises the envelope of a plurality of discrete rotational absorption lines which are spaced approximately 0.0024 cm$^{-1}$ apart and have a rotational line width of about 0.0007 cm$^{-1}$ at 0.005 atmospheres. The rotational line width varies linearly with pressure if the temperature is approximately 300 degrees K, and at other pressures is given approximately by the formula 0.14 p cm$^{-1}$, where p is the gas pressure in atmospheres, and where the temperature is approximately 300 degrees K.

Curve B of FIG. 3 shows the same $(\nu_3+\nu_4+\nu_6)$ rovibrational-combination-band absorption curve for $U^{235}F_6$ molecules. This absorption curve B of the $U^{235}F_6$ molecules, which are present in the gas mixture contained in the reaction chamber 12 or 12', envelopes essentially the same series of rotational lines as those covered under curve A, except that all lines are shifted in frequency by approximately 0.49 cm$^{-1}$. Also, the rotational line widths are a little thicker, namely approximately 0.0014 cm$^{-1}$ since the gas mixture in the reaction chamber 12 or 12' is at a pressure of approximately 0.1 atmospheres,.which is about twice the pressure in the filter cell. The spacing of the rotational lines under curve B is substantially the same as the rotational line spacing under curve A.

The pressures given in this example are only illustrative and good separation at other pressures may be obtained as well The main consideration in choosing an operating pressure is that the rotational line widths are not too thick so that they substantially overlap. This means that the value of the pressure, to which the rotational line widths are approximately linearly proportional, must be chosen such that the rotational line width does not substantially exceed the rotational line spacing in the vibrational absorption bands.

The operating temperatures of the $UF_6$ gas in the filter cell 58 and 58' and the reaction chamber 12 and 12' are chosen such that the $UF_6$ remains in a gaseous state. In the illustrative example given, the temperature of the $U^{238}F_6$ in the filter cell was taken to be 290 degrees K which is approximately room temperature. This temperature is high enough to maintain $UF_6$ in a gaseous state if the pressure is 0.005 atmospheres. The temperature in the reaction chamber was assumed to be about 300 degrees K which is a little higher than room temperature and is due to the fact that some heat of reaction will be produced in the reaction chamber. Again, the 300 degree K temperature is high enough to maintain $UF_6$ at 0.1 atmosphere in the gaseous phase. The other gases in the reaction chamber, $H_2$ and HF, also will remain gaseous at 300 degrees K. Of course any other temperatures instead of the ones used in the above illustration may be employed provided favorable conditions for isotope separation are maintained.

The laser 38 of FIG. 1 may be, for example, a $CO_2$ laser which can operate at a number of laser line frequencies spaced approximately 1.82 cm$^{-1}$ apart, within the envelope shown by curve C of FIG. 3. The center frequency of this envelope of possible laser lines is at approximately 944 cm$^{-1}$. Thus, as is clear in FIG. 3, the $CO_2$ laser lines fall within the left wings of the rovibrational $(\nu_3+\nu_4+\nu_6)$ absorption bands of $U^{235}F_6$ and $U_{238}F_6$. The line widths of the laser lines are extremely small and on the order of $10^{-8}$ cm$^{-1}$.

Figure 4:
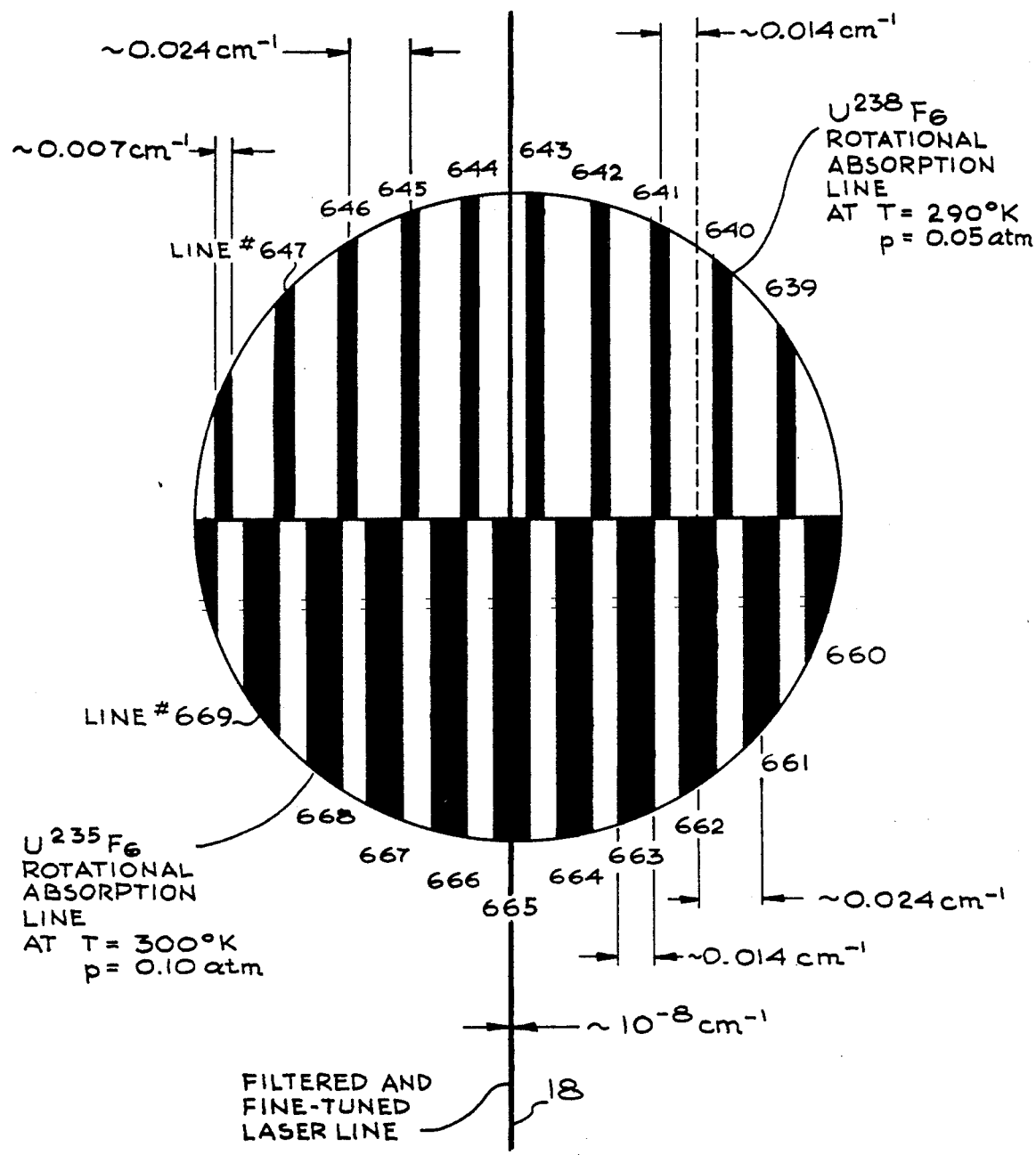
FIG. 4 is another graphical representation of some physical characteristics associated with the present invention; and, FIG. 5 is a graphical representation of physical characteristics associated with another embodiment of the present invention.

FIG. 4 shows an enlarged portion of FIG. 3, and as shown in FIG. 4, because the pressure of the $U^{238}F_6$ filter gas contained within the filter cell 58 or 58' is half the pressure of the $UF_6$ mixture contained within the reaction chamber 12 or 12', the width of the rotational absorption lines of the $U^{238}F_6$ in the filter cell is half the width of the rotational lines of the $UF_6$ mixture. As noted above, the center of each of the absorption lines of the $U^{235}F_6$ in the reaction chamber are shifted approximately 0.49 cm$^{-1}$ with respect to the absorption lines for the $U^{238}F_6$ molecules contained within the filter cell. As a result of this isotope shift, the $U^{235}F_6$ spectrum is shifted by twenty-one lines compared to the $U^{238}F_6$ spectrum, if the line separation is constant and equal to 0.024 cm$^{-1}$. If the lines starting from the center of the bands to the left are counted and numbered sequentially 1, 2, 3, 4, 5 ..., the 640th line of the $U^{238}F_6$ spectrum would be positioned just slightly to the left of the 661st line in the $U^{235}F_6$ spectrum, as shown in FIG. 4 by about 0.0014 cm$^{-1}$. The same applies to the 641st line of the $U^{238}F_6$ and the 662nd line off $U^{235}F_6$, etc.

The values for the isotope shift and the line spacing used in the above illustration are only approximate, and at present cannot be measured to a greater degree of accuracy. Further, the spacing of the lines is not constant but actually varies slowly and in a regular way with the position of each line, due to second-order effects. As a result, the rotational lines of $U^{235}F_6$ may fall between the rotational lines of $U^{238}F_6$ only in certain portions of the band and not over the entire band. In other portions of the band the lines of $U^{235}F_6$ and $U^{238}F_6$ might coincide The laser line selected for excitation of only the $U^{235}F_6$, and not the $U^{238}F_6$, must therefore be chosen to fall in a region of the band where the rotational lines of $U^{235}F_6$ and $U^{238}F_6$ not coincide, but substantially fall between each other's absorption profiles. Since most infrared lasers allow the lasing of some six to twenty lines separated by intervals with a value typically in the range of 0.5 to 2.5 cm$^{-1}$, it is generally possible to find a laser line which falls in a region where the $U^{235}F_6$ and $U^{238}F_6$ lines do not overlap and are separated, as illustrated in FIG. 4.

For example, the $CO_2$ laser can be lased at all, several, or one of fourteen $CO_2$ rotational line frequencies between 928 and 954 cm$^{-1}$, spaced approximately 1.86 cm$^{-1}$ apart shown schematically as curve C in FIG. 3. The laser lines themselves are extremely monochromatic and have widths estimated to be less than $10^{-8}$ cm$^{-1}$. At any one of the fourteen $CO_2$ rotational line frequencies between 928 and 954 cm$^{-1}$, say at 944 cm$^{-1}$, the laser line frequency can be fine-tuned and shifted towards a higher or lower frequency within the $CO_2$ rotational line width which under usual operating conditions amounts to approximately 0.008 cm$^{-1}$. Thus the laser line frequency at 944 cm$^{-1}$ can be varied between 943.966 and 944.004 cm$^{-1}$ by finetuning which, as mentioned before, is achieved by small changes in the end mirror spacing of the laser resonator system.

The suppression of those laser lines of the fourteen or so laser lines from the $CO_2$ laser that coincide with rotational absorption lines of $U^{238}F_6$ is accomplished by the filter cell 58 or 58' and only those lines are allowed in the photon beam 18 that fall between the rotational absorption lines of $U^{238}F_6$, as shown by curve D in FIG. 3, and shown for one laser line in FIG. 4. To cause the filtered laser line frequencies in the photon beam 18 to coincide with the $U^{235}F_6$ rotational line peaks, or to make them fall at frequencies as close to these peaks as possible, is achieved by the fine-tuning described before. If satisfactory matching cannot be achieved by this procedure, further improvements in matching may be obtained by increasing the gas mixture pressure in the reaction chamber which would broaden the frequency width of the rotational lines of the $U^{235}F_6$ and thereby eventually cover the laser line frequency such as the one shown in FIG. 4.

Since the filtered beam of photons 18 is substantially free of photons having energies at the frequencies associated with the rotational energy absorption lines of the $U^{238}F_6$, only the $U^{235}F_6$ molecules absorb energy by interaction with the photons in the reaction chamber 12 or 12' and are raised to an upper rovibrational energy level. At the upper rovibrational energy level, as noted above, the $U^{235}F_6$ molecules react with the gaseous hydrogen contained within the reaction chamber 12 to provide a chemical reaction product of $U^{235}F_4$.

It has been found that, in practice, there will be some contamination in the chemical product produced. That is, there will be a certain amount of $U^{238}F_6$ molecules that will be raised to the upper rovibrational energy level and react with the hydrogen. This would produce $U^{238}F_4$ molecules, which, of course, are also a solid precipitate which would contaminate the $U^{235}F_4$ precipitate. Such unwanted reactions may occur due to imperfect filtering of the laser output beam of photons 18, but is most likely due to energy transfer exchange collisions of the excited $U^{235}F_6$ molecules with the $U^{238}F_6$ molecules causing a transition of the $U^{238}F_6$ molecules from the lower rovibrational energy level to the upper rovibrational energy level.

In addition to the $(\nu_3+\nu_4+\nu_6)$ rovibrational band with a center frequency of approximately 960 cm$^{-1}$, there exists for uranium hexafluoride, other rovibrational bands centered at other frequencies, which require the use of other laser frequencies from those lasers which are near these band frequencies.

Figure 5:
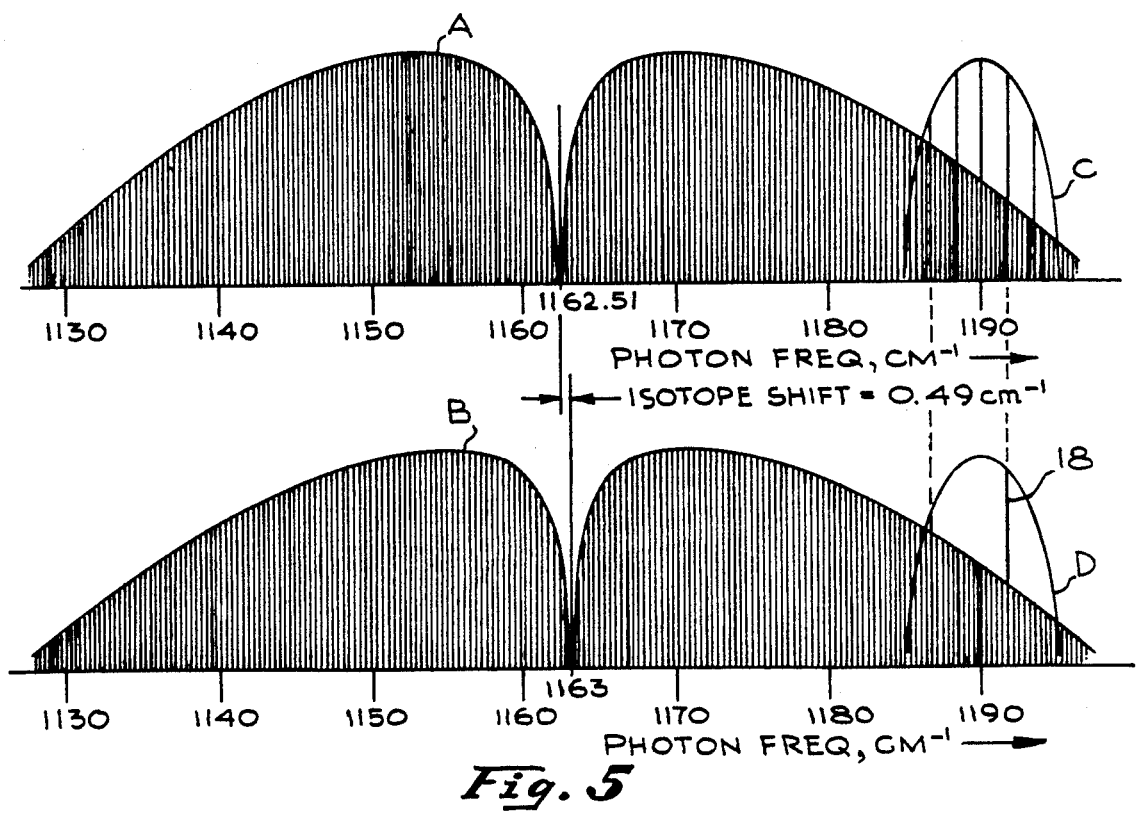

FIG. 5 shows another such band frequency and laser frequency, namely the $(\nu_2+\nu_4)$ rovibrational combination band of $UF_6$ with a center frequency of approximately 1163 cm$^{-1}$, and the 1190 cm$^{-1}$ laser radiation from the carbon-oxy-sulphide (OCS) laser. Again, the structure of the band shown in FIG. 5 is an idealized approximation of the actual band but it serves to illustrate all features that are pertinent. Curve A of FIG. 5 shows the $(\nu_2+\nu_4)$ band enveloping the rotational absorption lines of the $(\nu_2+\nu_4)$ band of $U^{238}F_6$, while curve B of FIG. 5 envelopes the rotational lines of the $(\nu_2+\nu_4)$ band of $U^{235}F_6$, which is again shifted approximately 0.49 cm$^{-1}$ in frequency from curve A in FIG. 5. Curves C and D of FIG. 5 indicate, similarly to curves C and D in FIG. 3, the possible laser lines of OCS before (curve C) and after (curve D) filtering through filter cell 58 or 58'. Table I below shows several additional $UF_6$ rovibrational absorption band center frequencies and laser frequencies closest to them, available from presently known lasers. The frequency mismatch between the laser frequency and the band center frequency determines where the center of the laser output photon frequencies occur with respect to the center of the rovibrational energy absorption band. Some of the laser frequencies listed in Table I are "doubled" frequencies which can be obtained by adding a frequency doubler 46 inside a laser resonator system as described before. The natural frequency of the laser is also listed in these cases, as seen in Table I. The double frequency provides the desired laser photon frequency for utilization with the $UF_6$. Of course, the lasers may be operated either continuously or they may be pulsed.

A table similar to Table I can be prepared for the vibronic energy level changes. The laser, in such a case, must be selected to provide, ultimately, a photon frequency corresponding to the desired vibronic energy level changes.

In addition to the $CO_2$, OCS, $H_2O$, HF, and $UF_6$ lasers shown in Table I, such lasers as DF, CO, NO, HCl, $CS_2$, $H_2S$, $SO_2$, HCN, $N_2O$, $NH_3$, $BCl_3$ and other molecular lasers as well as argon ion, krypton ion, xenon ion, and other lasers, for example, may also be utilized. The particular photon frequency output, either undoubled or doubled, of each of these lasers may be utilized either directly to provide the selective excitation of the predetermined isotope molecule contained within the reaction chamber 12 or 12', or indirectly after frequency conversion by means of the conversion crystal 72 and idler radiation source 74. The selection of the particular laser and the particular frequency line or lines of that laser will, of course, depend upon the photon-inducible rovibrational or vibronic energy transitions of the mixture of chemically identical but isotopically different molecules contained within the reaction chamber 12 or 12'. Similarly, the filter gas or material will also be selected to remove the photons associated with the energy absorption of the other chemically identical but isotopically different molecules so that the beam of filtered photons is substantially pure in just the photons having energy in the frequencies corresponding to the transitions of the predetermined isotopic molecules.

TABLE I

| TYPE LASER | | CENTER OF LASER OUTPUT PHOTON FREQUENCY (cm$^{-1}$) | CENTRAL FREQUENCY OF UF$_6$ ROVI-BRATIONAL BAND (cm$^{-1}$) | FREQUENCY MISMATCH (cm$^{-1}$) |
|---|---|---|---|---|
| CO$_2$ | | 944.15 | 959 ($\nu_3 + \nu_4 + \nu_6$) | 15 |
| H$_2$O | Natural | 302.76 | | |
| | Doubled | 605.52 | 623 ($\nu_4$) | 18 |
| H$_2$O | Natural | 357.51 | | |
| | Doubled | 705.02 | 674 ($\nu_2 + \nu_6$) | 31 |
| HF (5% H$_2$-95% CF$_4$) | | 692 | 674 ($\nu_2 + \nu_6$) | 18 |
| OCS | | 1190 | 1163 ($\nu_2 + \nu_4$) | 27 |
| UF$_6$ | | 190 | 200 ($\nu_3$) | 10 |
| | | 613 | 623 ($\nu_4$) | 10 |
| | | 665 | 675 ($\nu_2 + \nu_6$) | 10 |
| | | 705 | 716 ($\nu_2 + \nu_3$) | 10 |
| | | 805 | 825 ($\nu_4 + \nu_5$) | 10 |
| | | 840 | 850 ($\nu_1 + \nu_3$) | 10 |
| | | 1153 | 1163 ($\nu_2 + \nu_4$) | 10 |
| | | 1285 | 1295 ($\nu_1 + \nu_4$) | 10 |
| | | 2043 | 2053 ($2\nu_1 + \nu_3$) | 10 |

As noted above to produce an enrichment of $U^{235}$ much greater than that naturally occuring in uranium is one of the major applications for utilization of the present invention. However, the invention is not limited to the utilization of uranium hexafluoride as the mixture of chemically identical but isotopically different molecules. Rather, many other uranium compounds may be utilized advantageously to provide the enriched $U^{235}$. In general, it has been found to be advantageous to work with uranium containing molecules in which all the atomic species except uranium are mono-isotopic. Monoisotopic elements, of course, are those in which only one stable isotope exists in nature. Thus, the isotopic differences will be provided by the different isotopes of uranium, namely the $U^{235}$ and $U^{238}$. Further, it is generally advantageous to have a uranium-bearing molecular compound with a low melting point and a low boiling point so that it may be maintained as a fluid, that is, in the liquid or gaseous state with the possibility of obtaining the reaction product in a different physical state such as the solid state to facilitate final separation. Low operating temperatures are desired because of the broadening of the spectral absorption bands as noted above.

Further, in order to obtain large isotope shifts in the frequency of the photon absorption bands between the $U^{235}$ containing molecules and the $U^{238}$ containing molecules, it has been found that the combined mass of the other atoms contained within the molecules should be as high as possible. Accordingly, in addition to $UF_6$, it has been found that, for example, the molecules of $UI_4$, $UI_3$, $UI_2F_2$, $UIF_3$, $U_2As$, $UAs$, $UAs_2$, $UBI$, $UAl_2$, $UMn_2$, $UP$, $U_2P$, and $UP_2$ are also molecules that may be advantageously utilized in the practice of the present invention to separate the $U_{235}$ containing molecules from the $U_{238}$ containing molecules.

Additionally, other elements besides uranium may equally well be utilized in he practice of the present invention to provide a separation of one or more of a predetermined isotopic molecule from a mixture of chemically identical but isotopically different molecules. For example, Table II lists the element, the molecule and the isotopes thereof that may be separated to provide an enrichment of that isotope according to the principles of the present invention.

TABLE II

| ELEMENT | MOLECULE | ISOTOPES |
|---|---|---|
| Chlorine (Cl) | ClF; ClF$_3$; Cl$_2$O$_7$ | Cl-35 Cl-37 |
| Copper (Cu) | CuI; CuN$_3$ | Cu-63 Cu-65 |
| Gallium (Ga) | GaI$_3$; GaCl$_3$ | Ga-69 Ga-71 |
| Bromine (Br) | BrF; BrF$_3$; BrF$_5$ | Br-79 Br-81 |
| Silver (Ag) | AgN$_3$ | Ag-107 Ag-109 |
| Antimony (Sb) | SbF$_3$; SbF$_5$; SbH$_3$ | Sb-121 Sb-123 |
| Lanthanum (La) | LaI$_3$; LaF$_3$ | La-138 La-139 |
| Europium (Eu) | EuI$_2$ | Eu-151 Eu-153 |
| Rhenium (Re) | ReF$_6$ | Re-185 Re-187 |
| Iridium (Ir) | IrF$_6$ | Ir-191 Ir-193 |
| Thallium (Tl) | TlF; TlNO$_3$ | Tl-203 Tl-205 |
| Plutonium (Pu) | PuF$_6$ | Pu-236; Pu-238; Pu-239 Pu-240; Pu-241; Pu-242 |

Although hydrogen (H$_2$) was used in the example given above as the chemically reactive agent to provide a chemical reaction with UF$_6$, H$_2$ may also be used as the chemically reactive agent with halide gases of elements other than uranium, as shown in Table II. Additionally, many other chemically reactive gases may also be utilized. For example Hcl, Hbr, HI, I$_2$, Cl$_2$, Br$_2$, NH$_3$, CH$_4$, and various gaseous hydrocarbons may be used in place of H$_2$ in embodiments employing gaseous halide compounds, of the isotopes to be separated, such as those shown in Table II. Both the particular chemically reactive agent, as well as the particular halide compound with which it must significantly react when the halide compound is in the excited state, determines the pressure and temperature at which the halide compound and chemically reactive agent are mixed in the reaction chamber 12 or 12'. The pressure and temperature of the mixture in chamber 12 or 12' is selected to provide virtually no chemical reaction between the halide compound and the reactive agent in the initial mixture state, and the reaction occurs only after the halide compound is excited by laser irradiation. Thus, in selecting particular combinations of isotopic compounds and reactive agents, detailed chemical reaction kinetics parameters must be known for the pairs of reactants in order to determine optimum mixing pressures and temperates.

In the examples given heretofore, pure rovibrational excitations of UF$_6$ and other isotopic compounds were primarily considered. Examples of a vibronic excitation of UF$_6$, that is, an excitation in which there is both a change in the electronic state as well as in the vibrational state, are the UF$_6$ vibronic absorption bands centered at a frequency of approximately 27,410 cm$^{-1}$, 27,490 cm$^{-1}$, and 28,415 cm$^{-1}$, in the near-ultraviolet. Lasers with outputs in these bands are the Xenon-Ion Laser emitting a frequency of 27,400 cm$^{-1}$, and the Argon-Ion Laser emitting at a frequency of 27,485 cm$^{-1}$ and a frequency of 28,465 cm$^{-1}$. Similarly, the Krypton-Ion Laser emissions at a frequency of 28,480 cm$^{-1}$ and 28,000 cm$^{-1}$ may also be employed in connection with the excitation of the UF$_6$ vibronic absorption bands centered around 28,415 cm$^{-1}$ and 28,080 cm$^{-1}$.

For other isotopic halide compounds such as for example UI$_4$, PuF$_6$, GaI$_3$, or the like, as shown in Table II, there are vibronic absorption bands at other frequencies, and other appropriate laser lines falling in these bands to excite the halide compounds must be selected Selective filtering of the laser emissions and fine-tuning of the laser frequency to remove or suppress undesirable frequencies, and to excite only the halide compound containing the preselected isotope, is achieved as described above. Similarly, H$_2$ or other suitable reactive gases, as described above, may be utilized to achieve the desired chemical reaction with the selectively excited isotopic compound.

From the above, it can be seen that the present invention contemplates not only an improved process for effecting an enrichment of a predetermined isotope to a degree far greater than that found in a naturally occurring element, but also an improved structure for practicing the process. Those skilled in the art may find many variations and adaptations thereof and all such variations and adaptations falling within the true scope and spirit of the present invention are intended to be covered by the appended claims.

What is claimed is:

1. In a process for separating predetermined isotopic molecules from a mixture of chemically identical but isotopically different molecules to obtain a concentration of the predetermined isotope wherein the molecules comprising the mixture having a preselected lower rovibrational energy state and a higher rovibrational energy state with photon-inducible transitions between the lower rovibrational energy state and the higher rovibrational energy state and the photon frequency for the photon-inducible transitions between the lower and higher rovibrational energy states of the predetermined isotopic molecules is different from the photon frequency for the photon-inducible transitions between the lower and higher rovibrational energy states of the other chemically identical but isotopically different molecules in the mixture, the improvement comprising the steps of:

supplying the mixture of chemically identical but isotopically different molecules into a reaction chamber at the lower rovibrational energy state, and in a first preselected physicochemical state; and supplying a chemically reactive agent in the reaction chamber and the chemically reactive agent chemically combinable with the molecules at the higher rovibrational energy state to produce a chemical compound having atoms of the predetermined isotope in a second physicochemical state different from the first physicochemical state, and the chemically reactive agent unreactive with the molecules at the lower rovibrational energy state;

selectively photon inducing the transitions of the predetermined isotopic molecules from the lower rovibrational energy state to the higher rovibrational energy state to cause a chemical combination with the chemically reactive agent to provide a chemical compound having atoms of the predetermined isotope, and the step of selectively photon inducing the transitions of the predetermined isotopic molecules further comprises the steps of:

generating a beam of coherent photons having energy in the frequencies corresponding to the transitions of the molecules in the mixture from the lower rovibrational energy state to the higher rovibrational state;

filtering the beam of coherent photons to remove photons having energy at frequencies other than the frequencies corresponding to the transitions of the predetermined isotopic molecules from the lower rovibrational energy state to the higher rovibrational energy state; and subjecting the contents of the reaction chamber to the filtered beam of coherent photons to induce the transitions of the predetermined isotopic molecules from the lower rovibrational energy state to the higher rovibrational energy state;

maintaining the contents of the reaction chamber at first predetermined temperature and at a first predetermined pressure; and wherein the step of filtering the beam of coherent photons further comprises the steps of:

passing the beam of coherent photons through a filter cell containing a collection of the other chemically identical but isotopically different molecules contained in the mixture in the reaction chamber, and the collection of molecules in the filer cell substantially free of the predetermined isotopic molecules;

maintaining the collection of the molecules in the filter cell at a second predetermined temperature and a second predetermined pressure to provide molecules in the filter cell at the lower rovibrational energy state; and removing the chemical compound from the reaction chamber.

2. The process defined in claim 1 wherein:
the mixture of chemically identical but isotopically different molecules is continuously supplied to the reaction chamber;
the chemically reactive agent is continuously supplied to the reaction chamber;
the chemical compound is continuously removed from the reaction chamber; and
the contents of the reaction chamber is continuously subjected to the filtered beam of coherent photons.

3. The process defined in claim 2 wherein:
the first predetermined temperature and first predetermined pressure are different from the second predetermined temperature and second predetermined pressure.

4. The process defined in claim 3 wherein:
the mixture of chemically identical but isotopically different molecules in the reaction chamber is $UF_6$ containing a mixture of $U^{238}F_6$ and $U^{235}F_6$ molecules, and the predetermined isotopic molecules comprise the $U^{235}F_6$ molecules and the predetermined isotope comprises $U^{235}$;
the filter cell contains substantially pure $U^{238}F_6$ molecules;
the chemically reactive agent is hydrogen;
the first physicochemical state is the gaseous state;
the second physicochemical state is the solid state;
the chemical compound in the solid state is $U^{235}F_4$;
the first predetermined temperature is on the order of 300 degrees K and the first predetermined pressure is on the order of 0.01 atmospheres; and
the second predetermined temperature is on the order of 290 degrees K and the second predetermined pressure is on the order of 0.005 atmospheres.

5. The process defined in claim 4 wherein the step of generating a beam of coherent photons comprises the step of operating a laser, and the laser is selected from the class consisting of:
$CO_2$ laser, OCS laser, $H_2O$ laser, HF laser, and $UF_6$ laser.

6. The process defined in claim 5 wherein the step of operating the laser further comprises the step of:
continuously operating the laser.

7. The process defined in claim 5 wherein the step of operating the laser further comprises the step of:
pulsing the laser.

8. The process defined in claim 1 wherein:
the mixture of chemically identical but isotopically different molecules contains molecules having $U^{235}$ atoms and other molecules having $U^{238}$ atoms and the molecules containing the $U^{235}$ atoms are the predetermined molecules and $U^{235}$ is the predetermined isotope, and the mixture is selected from the class consisting of:
$UF_6$, $UI_4$, $UI_3F$, $UI_2F_2$, $UIF_3$, $UAs$, $U_2As$, $UAs_2$, $UBi$, $UAl_2$, $UMn_2$, $UP$, $U_2P$ and $UP_2$.

9. An isotope separation arrangement for separating predetermined isotopic molecules from a mixture of chemically identical but isotopically different molecules to obtain a concentration of the predetermined isotope comprising, in combination:
a reaction chamber having walls defining a cavity;
means for supplying a mixture into said cavity of said reaction chamber of the chemically identical but isotopically different molecules and said mixture containing the predetermined isotopic molecules having atoms of the predetermined isotope to be separated, and molecules containing atoms of other isotopes, and said mixture at a first preselected physicochemical state, a first predetermined pressure and a first predetermined temperature, and said molecules of said mixture having a lower rovibrational energy state and a higher rovibrational energy state, and photon-inducible transitions between said lower rovibrational energy state and said higher rovibrational energy state at predetermined photon frequencies, and said predetermined photon frequencies corresponding to said photon-inducible transitions of said molecules containing the isotope to be separated different from said predetermined photon frequencies corresponding to said photon-inducible transitions of said chemically identical but isotopically different molecules containing atoms other than said predetermined isotope;

means for supplying a chemically reactive agent into said reaction chamber, and said chemically reactive agent inactive with said molecules of said mixture for said molecules at said first preselected temperature and said first preselected pressure, and at said lower rovibrational energy state, and reactive with said molecules of said mixture for said molecules at said higher, rovibrational energy state;

means for irradiating said mixture with photons having energy at said predetermined photon frequency corresponding to said photon inducible transitions of said molecules containing said atoms of said isotope to be separated to induce the chemical reaction with said chemically reactive agent at said higher rovibrational energy state to provide a chemical reaction compound containing atoms of said predetermined isotope to be separated at a second preselected physicochemical state different from said first preselected physicochemical state, and said means for irradiating said mixture for chemically identical but isotopically different molecules further comprises:

means for generating a beam of coherent photons having energy in frequencies corresponding to said photon-inducible transitions of said molecules in said mixture of chemically identical but isotopically different molecules; and filter cell means for filtering said beam of coherent photons to remove therefrom photons having energy at frequencies corresponding to said photon-inducible transitions of said molecules in said mixture other than said molecules containing atoms of the predetermined isotope to be separated; and means for selectively removing said chemical reaction compound from said reaction chamber.

10. The arrangement defined in claim 9 wherein said filter cell further comprises:

a body member having walls defining a filter cell cavity; and a filter mixture in said filter cell cavity of said chemically identical but said isotopically different molecules of the type contained in said reaction chamber and said filter mixture substantially free of molecules containing atoms of said predetermined isotope to be separated, and said filter mixture at a second predetermined temperature and a second predetermined pressure, and at said lower rovibrational energy state and at said first preselected physicochemical state.

11. The arrangement defined in claim 10 wherein said means for generating a beam of coherent photons comprises a tunable laser and said filter cell is external to said laser.

12. The arrangement defined in claim 10 wherein said means for generating a coherent beam of photons comprises a tunable laser and said filter cell is positioned in said laser.

13. The arrangement defined in claim 10 wherein:

said mixture of chemically identical but isotopically different molecules in said reaction chamber comprises a first portion having atoms of $U^{235}$ bearing molecules and a second portion having atoms of $U^{238}$ bearing molecules and $U^{235}$ comprises the predetermined isotope to be separated.

14. The arrangement defined in claim 13 wherein said means for generating a beam of coherent photons comprises a $CO_2$ laser;

said mixture of chemically identical but isotopically different molecules in said reaction chamber comprises $UF_6$;

said filter mixture in said filter cell cavity comprises substantially pure $U^{238}F_6$ molecules and is substantially free of $U^{235}F_6$ molecules;

said first preselected physicochemical state is gaseous;

said second preselected physicochemical state is solid; and said chemical reaction compound is $U^{235}F_4$.

15. In a process for separating predetermined isotopic molecules from a mixture of chemically identical but isotopically different molecules to obtain a concentration of the predetermined isotope wherein the molecules comprising the mixture having a preselected lower vibronic energy state and a higher vibronic energy state with photon-inducible transitions between the lower vibronic energy state and the higher vibronic energy state and the photon frequency for the photon-inducible transitions between the lower and higher vibronic energy states of the predetermined isotopic molecules is different from the photon frequency for the photon-inducible transitions between the lower and higher vibronic energy states of the other chemically identical but isotopically different molecules in the mixture, the improvement comprising the steps of:

supplying the mixture of chemically identical but isotopically different molecules into a reaction chamber at the lower vibronic energy state, and in a first preselected physicochemical state;

supplying a chemically reactive agent into the reaction chamber and the chemically reactive agent chemically combinable with the molecules at the higher vibronic energy state to produce a chemical compound having atoms of the predetermined isotope in a second physicochemical state different from the first physicochemical state, and the chemically reactive agent unreactive with the molecules at the lower vibronic energy state;

selectively photon inducing the transitions of the predetermined isotopic molecules from the lower vibronic energy state to the higher vibronic energy state to cause a chemical combination with the chemically reactive agent to provide a chemical compound produced having atoms of the predetermined isotope, and the step of selectively photon inducing the transitions of the predetermined isotopic molecules further comprises the steps of:

generating a beam of coherent photons having energy in the frequencies corresponding to the transitions of the molecules in the mixture from the lower vibronic energy state to the higher vibronic state;

filtering the beam of coherent photons to remove photons having energy at frequencies other than the frequencies corresponding to the transitions of the predetermined isotopic molecules from the lower vibronic energy state to the higher vibronic energy state; and subjecting the contents of the reaction chamber to the filtered beam of coherent photons to induce the transitions of the predetermined isotopic molecules from the lower vibronic energy state to the higher vibronic energy state;

maintaining the contents of the reaction chamber at a first predetermined temperature and at a first predetermined pressure; and wherein the step of filtering the beam of coherent photons further comprises the steps of:

passing the beam of coherent photons through a filter cell containing a collection of the other chemically identical but isotopically different molecules contained in the mixture in the reaction chamber, and the collection of molecules in the filter cell substantially free of the predetermined isotopic molecules;

maintaining the collection of the molecules in the filter cell at a second predetermined temperature and a second predetermined pressure to provide molecules in the filter cell at the lower vibronic energy state; and removing the chemical compound from the reaction chamber.

16. An isotope separation arrangement for separating predetermined isotopic molecules from a mixture of chemically identical but isotopically different molecules to obtain a concentration of the predetermined isotope comprising, in combination:

a reaction chamber having walls defining a cavity;

means for supplying a mixture into said cavity of said reaction chamber of the chemically identical but isotopically different molecules and said mixture containing the predetermined isotopic molecules having atoms of the predetermined isotope to be separated, and molecules containing atoms of other isotopes, and said mixture at a first preselected physicochemical state, a first predetermined pressure and a first predetermined temperature, and said molecules of said mixture having a lower vibronic energy state and a higher vibronic energy state, and photon-inducible transitions between said lower vibronic energy state and said higher vibronic energy state at predetermined photon frequencies, and said predetermined photon frequencies corresponding to said photon-inducible transitions of said molecules containing the isotope to be separated different from said predetermined photon frequencies corresponding to said photon-inducible transitions of said chemically identical but isotopically different molecules containing atoms other than said predetermined isotope;

means for supplying a chemically reactive agent into said reaction chamber, and said chemically reactive agent inactive with said molecules of said mixture for said molecules at said first preselected temperature and said first preselected pressure, and at said lower vibronic energy state, and reactive with said molecules of said mixture for said molecules at said higher, vibronic energy state;

means for irradiating said mixture with photons having energy at said predetermined photon frequency corresponding to said photon inducible transitions of said molecules containing said atoms of said isotope to be separated to induce the chemical reaction with said chemically reactive agent at said higher vibronic energy state to provide a chemical reaction compound containing atoms of said predetermined isotope to be separated at a second preselected physicochemical state different from said first preselected physicochemical state, and said means for irradiating said mixture of chemically identical but isotopically different molecules further comprises:

means for generating a beam of coherent photons having energy in frequencies corresponding to said photon inducible transitions of said molecules in said mixture of chemically identical but isotopically different molecules; and filter cell means for filtering said beam of coherent photons to remove therefrom photons having energy at frequencies corresponding to said photon inducible transitions of said molecules in said mixture other than said molecules containing atoms of the predetermined isotope to be separated; and means for selectively removing said chemical reaction compound from said reaction chamber.

17. The arrangement defined in claim 16 wherein said filter cell further comprises:

a body member having walls defining a filter cell cavity; and a filter mixture in said filter cell cavity of said chemically identical but said isotopically different molecules of the type contained in said reaction chamber and said filter mixture free of molecules containing atoms of said predetermined isotope to be separated, and said filter mixture at a second predetermined temperature and a second predetermined pressure, and at said lower vibronic energy state and at said first preselected physicochemical state.

18. The arrangement defined in claim 17 wherein said means for generating a beam of coherent photons comprises a tunable laser and said filter cell is external to said laser.

19. The arrangement defined in claim 17 wherein said means for generating a coherent beam of photons comprises a tunable laser and said filter cell is positioned in said laser.

* * * * *